SINGLE CAPSTAN MAGNETIC TAPE TRANSPORT

Filed Oct. 7, 1968 2 Sheets-Sheet 1

INVENTORS
ROBERT E. SCHOENEMAN
JOEL H. LEVINE
BY
Laurence J. Marhoefer
ATTORNEY

SINGLE CAPSTAN MAGNETIC TAPE TRANSPORT

Filed Oct. 7, 1968

INVENTORS
ROBERT E. SCHOENEMAN
JOEL H. LEVINE
BY
Laurence J. Marhoefer
ATTORNEY

United States Patent Office 3,519,183

Patented July 7, 1970

3,519,183

SINGLE CAPSTAN MAGNETIC TAPE TRANSPORT

Joel H. Levine, Smithtown, and Robert E. Schoeneman, East Setauket, N.Y., assignors to Potter Instrument Company, Inc., Plainview, N.Y., a corporation of New York Filed Oct. 7, 1968, Ser. No. 765,419
Int. Cl. B65h *17/22*
U.S. Cl. 226—49 6 Claims

ABSTRACT OF THE DISCLOSURE

The specification and drawings disclose a transport for bi-directionally driving magnetic information storage tape through a fixed distance by means of a single capstan driven by a synchronous inductor motor which is coupled to an A.C. power supply for a predetermined number of A.C. cycles.

BACKGROUND OF THE INVENTION

This invention relates to a magnetic tape transport and, more particularly, to a single capstan transport that is simple in its design and inexpensive in its manufacture.

A so-called single capstan transport, as the term is used by those skilled in the art, is one in which the tape continuously engages a capstan driven by either a low inertia motor directly coupled to the capstan or by a continuously rotating motor coupled to the capstan by a clutch-brake system. An example of a single capstan transport employing a directly coupled low inertia motor is disclosed in U.S. Pat. No. 2,708,554, issued in the names of H. F. Welsh et al. on May 17, 1955.

With the advent of improved low inertia motors, such directly-driven single capstan transports have proved generally satisfactory. However, they are relatively expensive because of the relatively expensive electronic control systems required for rapidly starting and stopping the motor and/or running it at a constant speed.

One object of this invention is the provision of a simple, inexpensive, directly-driven single capstan transport which is capable of recording and reading information in an industry compatible format.

Another object of this invention is the provision of a simple inexpensive magnetic tape transport which can translate the tape a predetermined distance in response to a command signal. Such transports are particularly useful in direct data entry applications in which information received at an asynchronous rate is stored in a buffer and then recorded on the tape in a blocked format.

A still further object of the invention is the provision of an inexpensive directly-driven single capstan transport for operation at low tape speeds. At low tape speeds even a small change in actual speed is a relatively large change in terms of percentage variation from rated speed. As will be understood by those skilled in the art, in order to record in an industry compatible format, the tape speed cannot vary more than about plus or minus five percent of its nominal value.

SUMMARY OF THE INVENTION

Briefly, this invention contemplates the provision of a single capstan transport in which the capstan is driven by a directly coupled synchronous inductor motor. Critical damping of the capstan and motor keeps capstan speed variations within allowable limits while permitting sufficiently rapid starting and stopping of the tape to record in an industry compatible format. The motor is powered from alternating current (A.C.) power source, and tape is translated through a fixed distance by coupling the motor to the source for a predetermined integral number of A.C. half cycles.

BRIEF DESCRIPTION OF THE DRAWINGS

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views.

DESCRIPTION OF THE PREFERRED EMBODIMENTS

Figure 1:
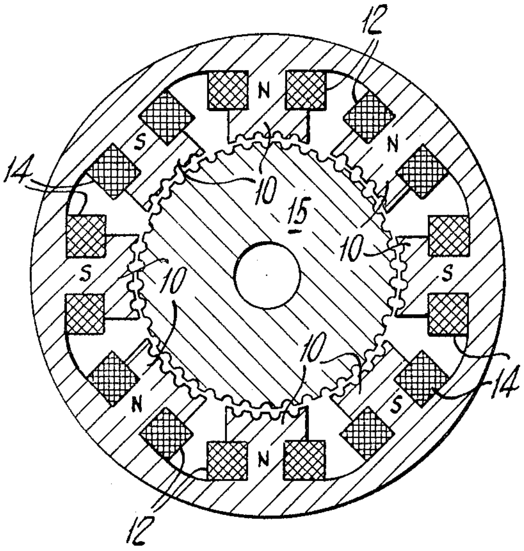
FIG. 1 is a sectional view of a synchronous inductor motor.

Referring now to FIG. 1 of the drawings, one example of a motor employed in the practice of this invention is the synchronous inductor motor which is described in detail in an article entitled "Characteristics of a Synchronous Inductor Motor" by Arthur E. Snowdon and Elmer W. Madsen. This article appeared in the March 1962 issue of Applications and Industry, published by the American Institute of Electrical Engineers. Briefly, in a specific embodiment of this invention that has proved satisfactory, the motor has eight salient poles 10 with a two-phase, four-pole winding. Coils marked 12 are interconnected to form one phase of the winding and coils marked 14 are interconnected and form the second phase. A permanent magnet rotor 15 has a series of tooth projections around its entire periphery which interact with similar tooth projections on the pole pieces 10 providing a variable reluctance air gap which induces a synchronizing voltage even though the rotor 15 is turning slowly. The rotor 15 is so constructed that its entire periphery is a south pole.

In this exemplary embodiment of the invention, the stator tooth pitch is 48 teeth for a full circle although there are only 40 actual teeth, one tooth per pole being omitted to allow space for the windings 12 and 14. The rotor tooth pitch is 50 teeth for a full circle; the rotor will advance one tooth for each complete cycle of applied alternating current (A.C.) power. The synchronous speed of this motor is 72 r.p.m. at 60 Hz. supply frequency. In general, the synchronous speed of such motors may be determined from the formula:

$$S=60f/n$$

where;

S=r.p.m. of rotor,
$n$=number of rotor teeth,
$f$=frequency of supply voltage.

It will be appreciated that the motor attains synchronous speed in approximately one cycle of the energizing potential and that owing to the permanent magnet rotor, it stops with a distance equal to a tooth pitch when the energizing potential is removed.

Figure 2:
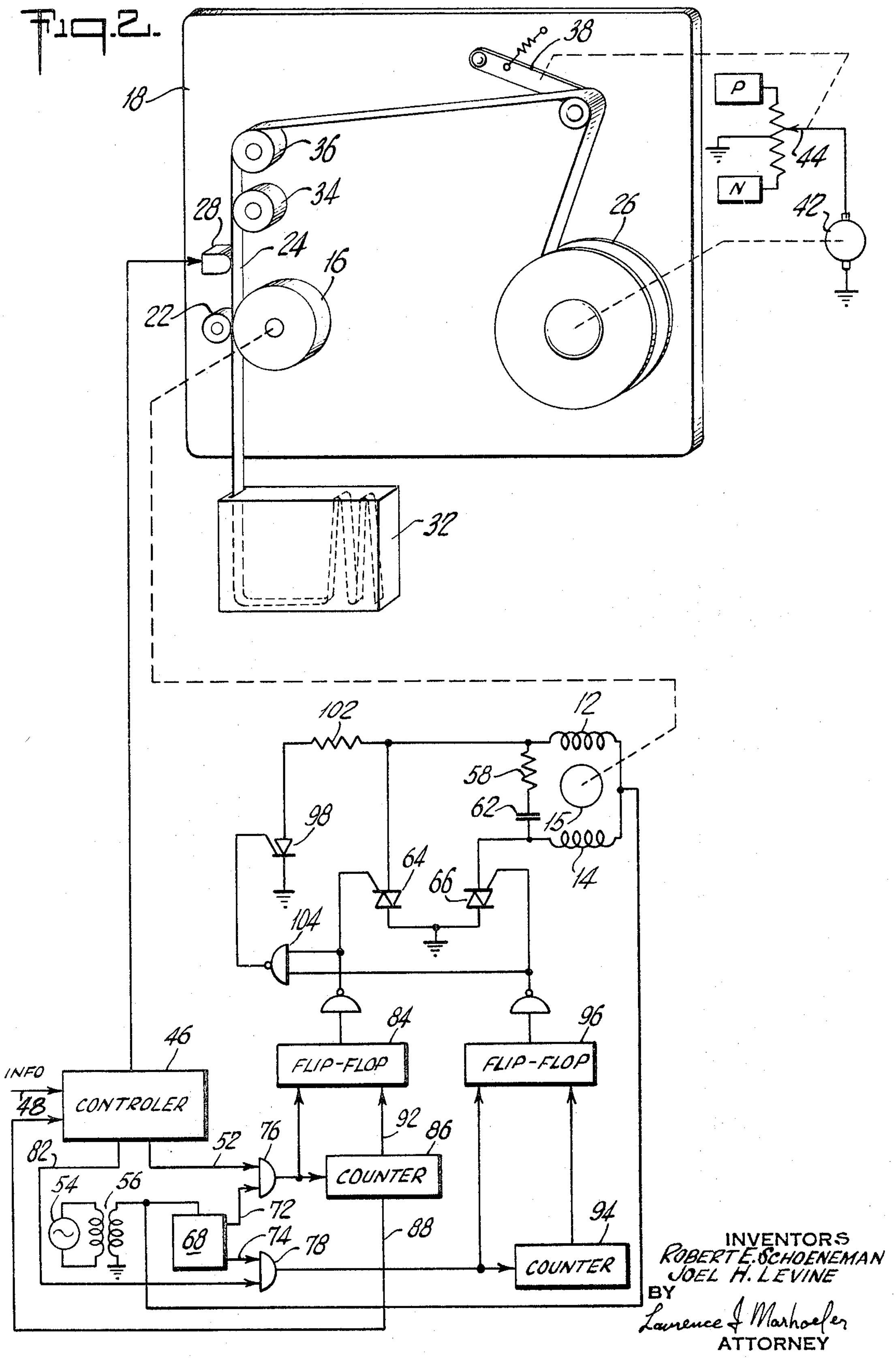
FIG. 2 is a schematic view of a magnetic tape transport constructed in accordance with the teachings of this invention.

Referring now to FIG. 2, the rotor 15 is directly coupled to a capstan 16 rotatably mounted on base plate 18. A roller 22 presses a magnetic tape 24 into continuous engagement with the capstan 16 while information is being recorded on or read from the tape; the roller 22 is retractable so that the tape may be rewound independently of the capstan. The tape 24 is stored on a reel 26 on one side of a transducer 28 and is driven by the capstan 16 past the transducer 28 and into a storage bin 32 on the other side of the transducer. Stationary guides 34 and 36 guide the tape so that it passes at right angles to the head 28.

A spring loaded rocker arm 38 tensions the tape 24 and controls a reel servo motor 42 which drives the reel 26. To control the motor 42, the rocker arm 38 is coupled to a potentiometer wiper arm 44 whose output is coupled to the reel servo motor 42. The motor 42 is thusly energized so as to cause the reel 26 to pay out and take up the tape 24, depending upon the position of the arm 38.

The specific embodiment of the invention shown in FIG. 2 has particular application as a direct entry to magnetic tape information storage device. Information received by a controller 46 on a line 48 from a keyboard, for example, is stored in a suitable buffer in the controller 46 such as a ferrite core buffer. When a predetermined number of binary bits has been stored, the controller 46 generates a tape advance signal which appears on line 52; in response to this signal the capstan 16 advances the tape 24 through a fixed distance past the head 28 as will be described now in detail.

One side of the windings 12 and 14 are coupled to an A.C. power source 54 via a transformer 56. Preferably, the power supply 54 is the so-called A.C. house current, which is advantageous because it provides a constant frequency supply and eliminates the need for (and the cost of) a special power supply. A phase-shifting network comprising resistor 58 and capacitor 62 causes the windings 12 and 14 to be energized 90 degrees out of phase with respect to one another.

The other side of the windings 12 and 14 are connected to ground via triacs 64 and 66 respectively. Two triacs are used in order to provide bi-directional rotation of the rotor 15; conduction through triac 64 producing clockwise rotation of the rotor, for example, and conduction through triac 66 producing counter-clockwise rotation of the rotor 15. As will be appreciated by those skilled in the art, a triac is a silicon semiconductor device that is similar to a silicon control rectifier but the triac is capable of bi-directional conduction. These devices are explained in detail in various manufacturers' manuals, such as the R.C.A. Silicon Power Circuits Manual, prepared by the R.C.A. Electronic Components & Devices Division of Harrison, N.J.

Figure 3:
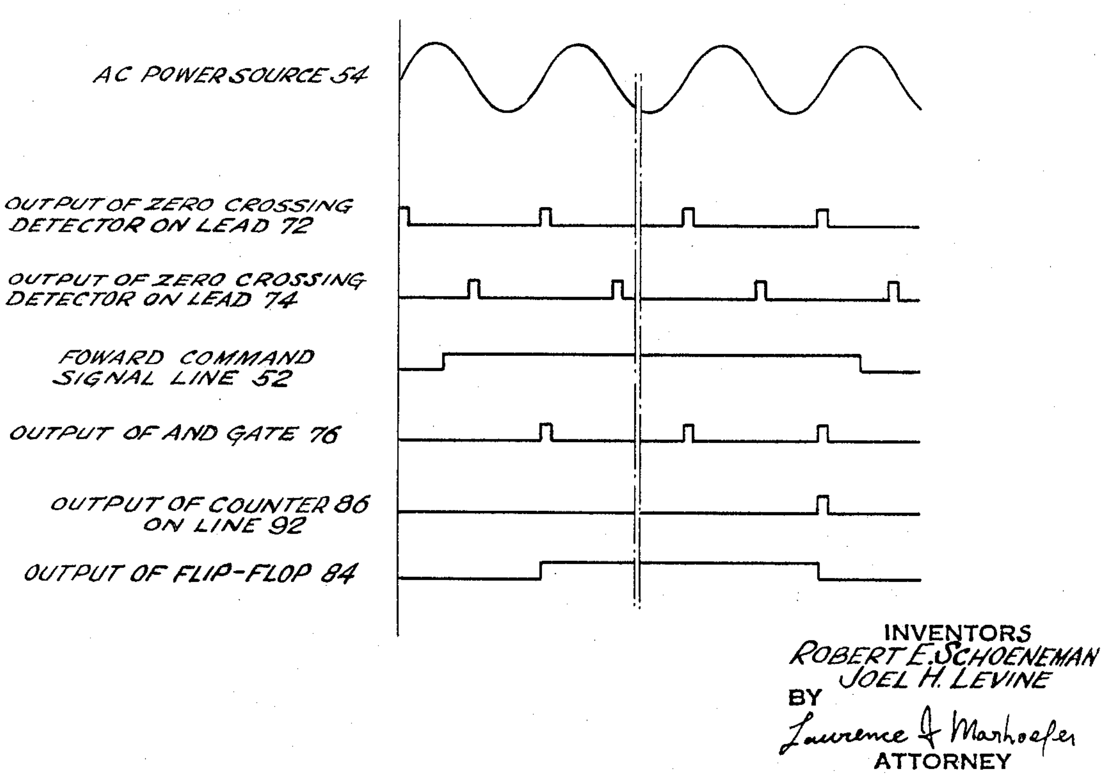
FIG. 3 is a timing diagram showing the instantaneous relationship among signals at various indicated locations in FIG. 2.

Referring now to FIG 3 as well as FIG. 2, the transformer 56 is also coupled to a zero crossing detector 68 which generates a pulse on line 72 for each positive going crossing of the sine wave and a pulse on line 74 for each negative going crossing of the sine wave. Lines 72 and 74 are coupled respectively as inputs to AND gates 76 and 78; the enabling inputs to these gates are coupled to the controller via lines 52 and 82 respectively.

Aa tape advance command signal on line 52 subsists for an interval sufficient to advance the tape one block length, for example, and enables gate 76 so that pulses on line 72 during this interval are coupled both to a flip-flop 84 and a counter 86. The first pulse sets flip-flop 84 and thereby turns on triac 64. The rotor 15 accelerates in a counter-clockwise sense, driving capstan 16 in the same sense and thereby advancing tape 24 past the head 28. After one complete cycle of A.C. power has been applied to windings 12 and 14, the rotor 15 is rotating at synchronous speed. At this time counter 86 will have counted two pulses and will produce an output on line 88 which signals the controller 46 that the tape 24 is up to speed. Information stored in the buffer now may be coupled to the head 28.

After a predetermined number of pulses have been counted by the counter 86 (five for example), the counter 86 produces an output on line 92 that resets the flip-flop 84 to its other stable state and thereby turns off triac 64. The tape 24 will have been driven through a fixed distance which is a function of the predetermined number of pulses counted by counter 86 prior to turning off triac 64 and of the tooth pitch of the rotor 15.

In a similar manner the capstan 16 can be driven in a clockwise sense to retract a fixed length of tape in order to position a just previously recorded information block so that it can be read and thereby compared with the information stored in the buffer to check that the information was correctly recorded. To this end, the output of AND gate 78 is coupled to a flip-flop 96 and a counter 94 which cooperate to turn on and off triac 66 in the manner just previously described for the clockwise rotation of rotor 15.

The permanent magnet rotor 15 stops and locks in position within the pitch of one tooth after triac 64 or 66 has turned off. However, it is sometimes advantageous to provide an additional locking force to prevent rotation of the tape capstan due to tape tension. Passing a D.C. current through the winding 12 or 14 after the triacs 64 and 66 have stopped conducting provides such an additional locking force. To provide this D.C. current, a silicon control rectifier 98 is coupled via a current limiting resistor 102 in series between the coil 12 and ground. When both flip-flops 84 and 96 are in their first stable state, both triacs are off, an output from an AND gate 104 turns on SCR98.

Figure 4:
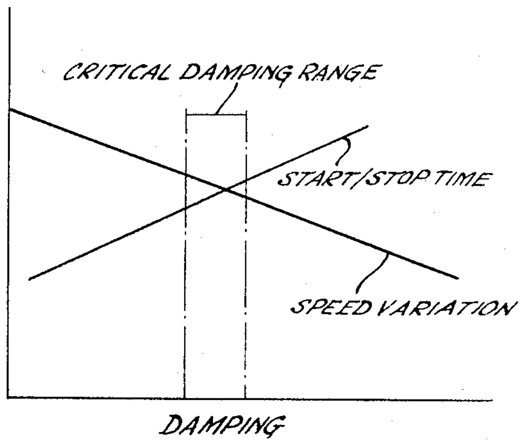
FIG. 4 is a picture of the relationship among damping, starting and stopping times, and capstan speed variations for a transport constructed in accordance with the teachings of this invention.

The speed of the synchronous inductor motor oscillates about its synchronous speed; these oscillatory speed variations may exceed the permissible speed variations required for writing industry compatible magnetic tapes. As graphically indicated in FIG. 4, such speed variations decrease with increased damping of the capstan and motor. However, as also graphically indicated in FIG. 4, the time for starting and stopping the capstan increases with increased damping. Thusly, the motor and capstan must be so damped that any speed variations are within allowable limits but must not be overdamped, preventing starting and stopping of the capstan within allowable distances.

Any suitable damping known in the art may be employed, including electronic damping. One particularly advantageous system is to use in combination a relatively high inertia capstan 16 and to fill the gap between the rotor 15 and the poles 10 with a viscose fluid, such as a silicon oil.

Thus, it will be seen that the objects of this invention have been accomplished. The use of a directly coupled synchronous inductor motor provides a simple, inexpensive directly driven single capstan transport which is capable of low speed operation and can translate the tape through a fixed distance without expensive and elaborate control circuitry.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A magnetic tape transport for moving a magnetic tape bi-directionally through a predetermined distance in response to a command, comprising in combination:

a capstan for driving said magnetic tape, a synchronous motor directly coupled to said capstan for driving said capstan, means including counter means for coupling said motor to an alternating power supply for a predetermined number of alternating current cycles to rotate the periphery of said capstan through a predetermined distance whereby said magnetic tape is driven a predetermined distance.

2. A magnetic tape transport as in claim 1 wherein said synchronous motor is a synchronous inductor motor.

3. A magnetic tape transport as in claim 2 wherein said coupling means includes a phase-splitting means for energizing said motor for bi-directional rotation, and wherein said counter means couples said motor to said alternating current power supply for a greater number of predetermined alternating current cycles when advancing said tape as compared with the number of alternating current cycles when retracting said tape.

4. A magnetic tape transport as in any one of claims 1, 2, and 3 further including means responsive to the output of said counter means for energizing said motor with a holding current when said motor is unenergized for forward or reverse movement.

5. A magnetic tape transport as in claim 2 or 3 further including a zero crossing detector, means for coupling the output of said zero crossing detector to said counter, and means for coupling the input of said zero crossing detector to said alternating current power input means.

6. A magnetic tape transport as in claims 2 or 3 further including means for critically damping said motor and said capstan.

References Cited

UNITED STATES PATENTS

| | | | |
|---|---|---|---|
| 3,389,843 | 6/1968 | Touchman | 226—156 |
| 3,425,613 | 2/1969 | Reisfeld | 226—188 X |

RICHARD A. SCHACHER, Primary Examiner

U.S. Cl. X.R.

226—134, 152; 318—10, 138